(12) United States Patent
Foitzik et al.

(10) Patent No.: US 10,919,512 B2
(45) Date of Patent: Feb. 16, 2021

(54) METHOD FOR DETECTING A LEAKAGE DURING OPERATION OF A BRAKING SYSTEM FOR A VEHICLE AND BRAKING SYSTEM FOR A VEHICLE

(71) Applicant: Robert Bosch GmbH, Stuttgart (DE)

(72) Inventors: Bertram Foitzik, Ilsfeld (DE); Timo Haible, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 16/531,424

(22) Filed: Aug. 5, 2019

(65) Prior Publication Data
US 2020/0047734 A1 Feb. 13, 2020

(30) Foreign Application Priority Data
Aug. 8, 2018 (DE) .......................... 10 2018 213 306

(51) Int. Cl.
*B60T 13/74* (2006.01)
*B60T 17/22* (2006.01)
(Continued)

(52) U.S. Cl.
CPC ............ *B60T 17/221* (2013.01); *B60T 8/409* (2013.01); *B60T 8/4072* (2013.01);
(Continued)

(58) Field of Classification Search
CPC ............. G01M 3/02; G01M 3/26; G01M 3/00
See application file for complete search history.

(56) References Cited

U.S. PATENT DOCUMENTS

| | | | |
|---|---|---|---|
| 4,635,469 A | * | 1/1987 | Modera ............... G01M 3/3236 73/40 |
| 2001/0028194 A1 | * | 10/2001 | Isono ........................ B60T 8/94 303/122 |

(Continued)

FOREIGN PATENT DOCUMENTS

| | | |
|---|---|---|
| DE | 102011079454 A1 | 1/2013 |
| DE | 102016224057 A1 | 6/2017 |

*Primary Examiner* — Peter J Macchiarolo
*Assistant Examiner* — Fatemeh Esfandiari Nia
(74) *Attorney, Agent, or Firm* — Norton Rose Fulbright US LLP; Gerard Messina

(57) ABSTRACT

A method is described for detecting a leakage during the operation of a braking system. A braking intention signal characterizing a braking intention is generated by actuating a final control system of an actuating circuit; a setpoint braking pressure required in an active circuit is ascertained based on the braking intention signal; an actual braking pressure in the active circuit is set according to the setpoint braking pressure with the aid of a pressure generation unit by moving a displacement piston to actuate a wheel brake coupled to the active circuit; and a pressure modulation is carried out. The pressure modulation includes setting the actual braking pressure in the active circuit to a value greater than the setpoint braking pressure, and lowering the actual braking pressure until the setpoint braking pressure is reached by moving the displacement piston at a predetermined piston speed. Furthermore, a chronological pressure gradient is ascertained, as the actual braking pressure is being lowered, during the pressure modulation, and a leakage of the active circuit is detected based on the ascertained pressure gradient when the pressure gradient is outside a range predetermined for the piston speed.

7 Claims, 2 Drawing Sheets

(51) Int. Cl.
| | |
|---|---|
| *B60T 8/88* | (2006.01) |
| *B60T 17/18* | (2006.01) |
| *B60T 8/40* | (2006.01) |
| *G01M 3/00* | (2006.01) |
| *G01M 3/02* | (2006.01) |
| *G01L 5/28* | (2006.01) |
| *G01M 3/26* | (2006.01) |

(52) U.S. Cl.
CPC ............ *B60T 8/4081* (2013.01); *B60T 8/885* (2013.01); *B60T 17/18* (2013.01); *G01L 5/28* (2013.01); *G01M 3/00* (2013.01); *G01M 3/02* (2013.01); *G01M 3/025* (2013.01); *B60T 2270/403* (2013.01); *G01M 3/26* (2013.01)

(56) References Cited

U.S. PATENT DOCUMENTS

| | | | |
|---|---|---|---|
| 2006/0158032 A1* | 7/2006 | Miyazaki | B60T 8/4081 303/155 |
| 2014/0008965 A1* | 1/2014 | Ito | B60T 13/58 303/3 |
| 2017/0050629 A1* | 2/2017 | Kim | B60T 13/686 |
| 2017/0217415 A1* | 8/2017 | Kim | B60T 8/172 |
| 2018/0297574 A1* | 10/2018 | Zimmermann | B60T 13/167 |
| 2018/0370509 A1* | 12/2018 | Yagashira | B60T 17/18 |
| 2019/0184958 A1* | 6/2019 | Watanabe | B60T 13/142 |
| 2019/0299962 A1* | 10/2019 | Leiber | B60T 17/222 |

* cited by examiner

METHOD FOR DETECTING A LEAKAGE DURING OPERATION OF A BRAKING SYSTEM FOR A VEHICLE AND BRAKING SYSTEM FOR A VEHICLE

BACKGROUND INFORMATION

Braking systems for vehicles, in particular for motor vehicles, such as passenger cars or trucks, are usually implemented as electrohydraulic braking systems in which a hydraulic pressure is generated in a brake circuit for actuating wheel brakes by a master brake cylinder actuated with the aid of a manual actuating unit. The pressure generation in the braking force progression is usually supported by a pressure generation unit, which includes a movable displacement piston or plunger.

So-called brake by wire systems are also increasingly used. Such a system is described in German Published Patent Application No. 10 2011 079 454, for example. In this braking system, an actuating circuit is provided, in which a hydraulic pressure is generated by actuating a master brake cylinder. This pressure is detected and, based on the detected pressure, a setpoint braking pressure is ascertained, which is set with the aid of a pressure generation unit, which includes an electric motor and a displacement piston movable with the aid of the electric motor, in an active circuit for actuating the wheel brakes.

German Published Patent Application No. 10 2016 224 057 describes a method for detecting leakage in such a system. The actuating circuit predefines a certain pressure for the active circuit and checks whether the pressure achieved in the active circuit meets a certain criterion.

SUMMARY

The present invention relates to a method for detecting a leakage during the operation of a braking system for a vehicle and to a braking system for a vehicle, in particular for a motor vehicle.

According to a first aspect of the present invention, a method for detecting a leakage during the operation of a braking system for a vehicle is provided.

The method according to the present invention includes generating a braking intention signal characterizing a braking intention by actuating a final control system of an actuating circuit. Consequently, in this step a signal is generated which represents a desired deceleration of the vehicle.

In a further step, a setpoint braking pressure required in an active circuit is ascertained based on the braking intention signal. The braking intention signal thus forms an input variable for an ascertainment function, which may, for example, be implemented as a software module. This ascertainment function ascertains a value for a braking pressure, which is to be set in an active circuit, as an output variable.

Moreover, a setting of an actual braking pressure in the active circuit according to the setpoint braking pressure is carried out with the aid of a pressure generation unit by moving a displacement piston of the pressure generation unit to actuate a wheel brake coupled to the active circuit. The displacement piston may be moved, for example, with the aid of an electric motor. In particular, the displacement piston is moved in a translatory manner to displace a hydraulic fluid, whereby the pressure in the active circuit is varied, and thus a wheel brake acting on a wheel of the vehicle is actuated.

According to the present invention, a pressure modulation is additionally carried out. The actual braking pressure in the active circuit is initially set with the aid of the pressure generation unit to a value greater than the setpoint braking pressure. Thereafter, the actual braking pressure is lowered until the setpoint braking pressure is reached by moving the displacement piston at a predetermined piston speed. For this purpose, the displacement piston is moved at a predefined speed in such a way that a volume of hydraulic fluid in a cylinder guiding the displacement piston increases. In this way, a volume flow $q_K$ of hydraulic fluid is generated, which may be computed from predefined speed v of the displacement piston and a known cross-sectional area A of the displacement piston as $$q_K = v \cdot A. \tag{I}$$

Furthermore, a chronological pressure gradient is ascertained as the actual braking pressure is being lowered during the pressure modulation. For example, this may be an average pressure gradient, which results from pressure difference $\Delta p$ between the initially set actual braking pressure $p_{actual}$ and the setpoint braking pressure and time tab required for the pressure reduction, according to $$\frac{dp_{actual}}{dt} = \frac{\Delta p}{\Delta t_{ab}}. \tag{II}$$

According to the present invention, a leakage of the active circuit is detected based on the detected pressure gradient when the pressure gradient is outside a range predetermined for the piston speed, in particular when a value of the pressure gradient is greater than a predetermined threshold value.

In the event of a leakage, a total volume flow $q_{total}$, which is composed of volume flow $q_K$ generated by the displacement piston and a leakage volume flow $q_{leak}$, exits the active circuit during the pressure reduction, according to $$q_{total} = q_K + q_{leak}. \tag{III}$$

When the active circuit is tight, i.e., no leakage occurs and $q_{leak}=0$, the active circuit has a certain elasticity e. The elasticity describes the slope of a curve describing the relationship between the actual braking pressure and a volume V of hydraulic fluid present in the active circuit. This curve is determined in advance for the active circuit. Elasticity e thus describes the relationship $$e = \frac{dV}{dp_{actual}}. \tag{IV}$$

Total volume flow $q_{total}$ as $$q_{total} = \frac{dV}{dt} \tag{V}$$

results from the relationship from (IV)

$$q_{total} = e \frac{dp}{dt}. \tag{VI}$$

Inserting (II) in (VI) results in:

$$q_{total} = e\frac{\Delta p}{\Delta t_{ab}}. \quad (VII)$$

With the aid of (III) and (I), the leakage volume flow may thus be determined using $$q_{leak} = e\frac{\Delta p}{\Delta t_{ab}} - v \cdot A. \quad (VIII)$$

Since, when $q_{leak}=0$, the pressure gradient is described by $$\frac{v \cdot A}{e},$$

it is also known for a known piston speed. A deviation of the actual pressure gradient from the pressure gradient which results for the known piston speed at $q_{leak}=0$ thus indicates the presence of a leakage.

One of the advantages of this method is that it may be carried out during a pressure modulation, which advantageously relieves a drive of the displacement piston when the time which is required for the pressure reduction is considerably longer than the time which is required for setting the actual braking pressure to a value greater than the setpoint braking pressure, for example 10 to 50 times longer. A relief of the drive takes place in the process since frictional losses at the pressure generation device unit counteract the pressure reduction, and thus support the drive. If a leakage occurs, the pressure reduction due to the leakage volume flow takes place considerably faster, thus reducing the relief effect.

According to a further aspect of the present invention, a braking system is provided. The braking system includes an actuating circuit including a final control system actuatable with the aid of an actuating unit for generating a braking intention signal, an active circuit having a pressure generation unit, which includes a displacement piston movable in a translatory manner, and at least one wheel brake coupled hydraulically to the pressure generation unit, a sensor unit for detecting an actual braking pressure in the active circuit, and a control unit, which is connected to the final control system of the actuating circuit, to the sensor unit and to the pressure generation unit of the active circuit. The control unit is configured to ascertain, from the braking intention signal, a setpoint braking pressure required in the active circuit, to activate the pressure generation unit for setting the actual braking pressure in the active circuit by moving the displacement piston according to the setpoint braking pressure; to activate the pressure generation unit for carrying out a pressure modulation, including setting the actual braking pressure in the active circuit to a value greater than the setpoint braking pressure and lowering the actual braking pressure until the setpoint braking pressure is reached, by moving the displacement piston at a predetermined piston speed; to ascertain, from the actual braking pressure detected with the aid of the sensor unit, a chronological pressure gradient as the actual braking pressure is being lowered during the pressure modulation; and to detect a leakage in the active circuit based on the detected pressure gradient when the pressure gradient is outside a range predetermined for the piston speed.

The control unit of the braking system is thus, in particular, configured to prompt the pressure generation unit to carry out the steps of the method according to the present invention, in particular the steps of the pressure modulation, and to carry out the above-described detection of a leakage.

According to one specific embodiment of the method, it is provided that the detection of the leakage includes comparing a reduction time, which is required, when lowering the actual braking pressure, in order to lower the actual braking pressure to the setpoint braking pressure, to a build-up time, which is required when setting the actual braking pressure, in order to build up the actual braking pressure from the setpoint braking pressure to the value greater than the setpoint braking pressure. The time for setting a maximum actual pressure, proceeding from the setpoint braking pressure, is thus compared to a time required for subsequently lowering the actual pressure at the predefined piston speed. As a result of this comparison, an extremely simple criterion detectable with high accuracy exists for the detection of a leakage.

According to one further specific embodiment of the method, it is provided that, during the pressure modulation, the actual braking pressure in the active circuit is set to a value greater than the setpoint braking pressure using a constant pressure gradient. Accordingly, it is possible to set the maximum actual braking pressure in a controlled manner. This facilitates the detection of a leakage, for example by carrying out the above-described chronological comparison.

According to one further specific embodiment of the method, it is provided that the piston speed is constant as the actual braking pressure is being lowered during the pressure modulation. In this way, the ascertainment of the volume flow generated by the piston during the pressure reduction is facilitated in terms of processing so that less computing power has to be provided on the hardware side, or the computing time is advantageously shortened for a given computing power.

According to one further specific embodiment of the method, it is provided that carrying out the pressure modulation requires the presence of one or multiple of the following conditions:
a) the braking intention signal is constant over a predetermined time period;
b) a detected rotational speed of a wheel decelerated by the wheel brake is smaller than a predetermined rotational speed threshold value;
c) the ascertained setpoint braking pressure of the active circuit is greater than a predetermined pressure threshold value;
d) a variable characterizing a thermal loading of an electric motor of the pressure generation unit reaches a predefined loading threshold value.

These conditions each characterize situations in which typically a high setpoint braking pressure is requested over an extended time period. In such situations, there is a need, on the one hand, to relieve the drive of the pressure generation unit through pressure modulation. On the other hand, a particularly high leakage volume flow typically occurs in these situations, so that it is easily and reliably detectable.

Condition b) may be met, for example, when the detected rotational speed is so small that it may be assumed that the vehicle is at a standstill. In particular, the rotational speed threshold value may be defined by a number of revolutions per second of the particular wheel, which corresponds to a driving speed of the vehicle of 3 km/h. This offers the advantage that a pressure modulation is not carried out at higher speeds, whereby a noticeability of the pressure modulation by the driver is advantageously avoided.

According to one specific embodiment of the braking system, it is provided that the final control system includes a master brake cylinder actuatable with the aid of the actuating unit, and a sensor unit for detecting a hydraulic pressure in the actuating circuit generated by the actuation of the master brake cylinder and/or an actuating distance of the actuating unit as variables characterizing a braking intention, the braking intention signal being formed by the variables which characterize the braking intention and are detected with the aid of the sensor unit.

DETAILED DESCRIPTION

Figure 1:
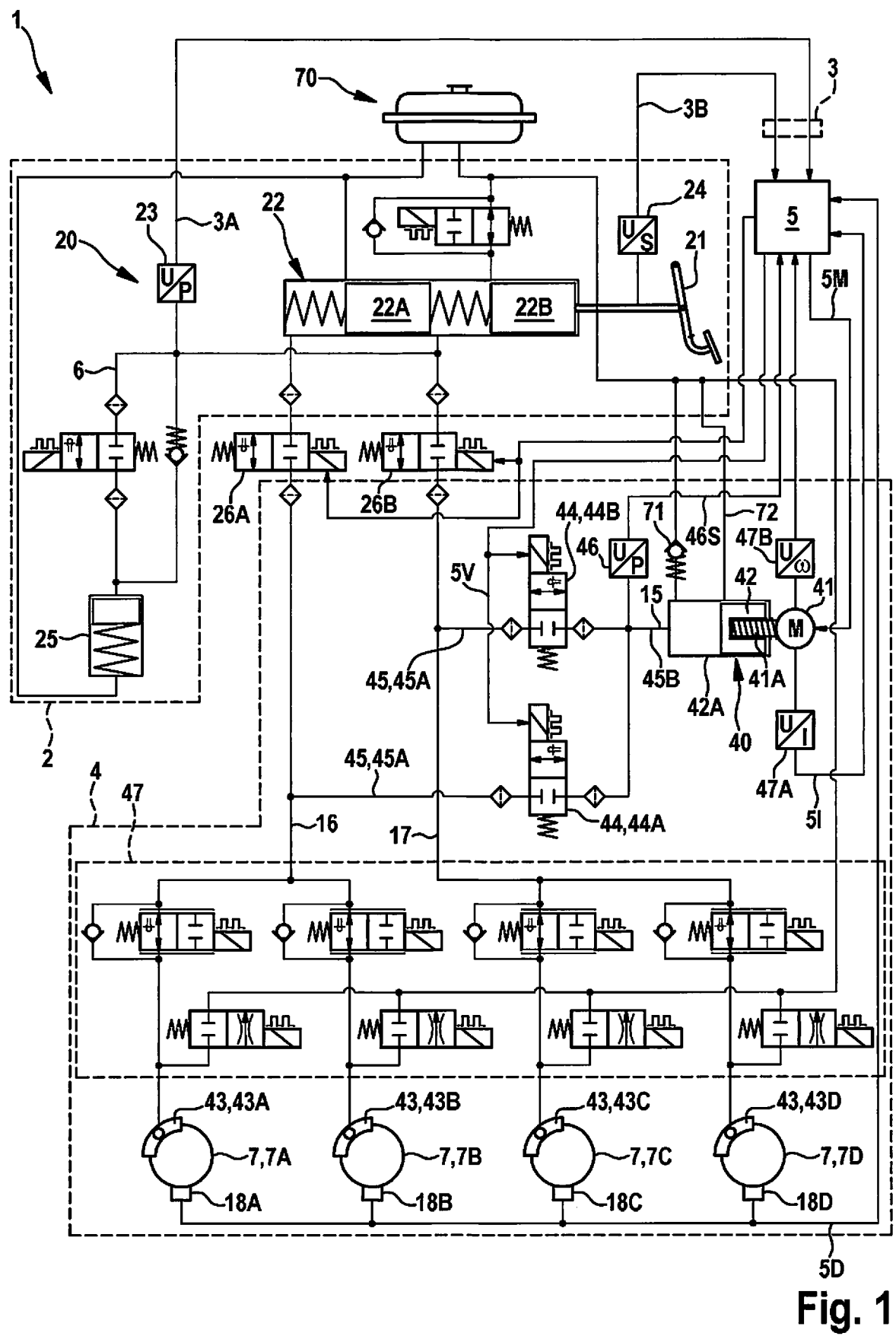
FIG. 1 shows a schematic illustration of a braking system according to one exemplary embodiment of the present invention.

In the figures of the drawings, identical, functionally equivalent and identically acting elements, features and components are denoted by the same reference numerals, unless indicated otherwise.

FIG. 1, by way of example, shows a braking system 1 for a vehicle. As is shown in FIG. 1, braking system 1 includes an actuating circuit 2, an active circuit 4, and a control unit 5.

Actuating circuit 2 shown by way of example in FIG. 1 includes a final control system 20 and an actuating unit 21. Final control system 20 may, in particular, as is shown by way of example in FIG. 1, include a hydraulic master brake cylinder 22 and a sensor unit having at least one pressure sensor 23 and one actuating distance sensor 24. Final control system 20 may furthermore include an optional return simulator 25. In final control system 20 shown by way of example in FIG. 1, master brake cylinder 22 is actuatable with the aid of actuating unit 21, which in FIG. 1 is shown as a foot pedal by way of example. The actuation of master brake cylinder 22 includes a displacement of one or multiple displacement piston(s) 22A, 22B, whereby a hydraulic fluid, for example oil, is displaced against a restoring force, and thereby a hydraulic pressure is generated in actuating circuit 2.

The restoring force may, for example, be generated by optional return simulator 25, which is hydraulically coupled, i.e., in a fluid-conducting manner, via a hydraulic line 6 to master brake cylinder 22.

Optional pressure sensor 23 detects the pressure generated by master brake cylinder 22, and generates a pressure signal 3A representing this pressure. By way of example, pressure sensor 23 is hydraulically coupled to hydraulic line 6 via return simulator 25 in FIG. 1. Optional actuating distance sensor 24 detects an actuating distance traveled by actuating unit 21 and generates an actuating distance signal 3B representing the actuating distance. In the present example, pressure signal 3A and actuating distance signal 3B together form an exemplary braking intention signal 3, which is generated with the aid of final control system 20.

Final control system 20 may, as an alternative, also only be formed by actuating distance sensor 24, which detects the actuating distance of actuating unit 21. In this case, braking intention signal 3 is formed by actuating distance signal 3B.

Active circuit 4 includes a pressure generation unit 40, at least one wheel brake 43 and a sensor unit 46 in the form of a braking pressure sensor for detecting an actual braking pressure. Optionally, at least one separating valve 44 is provided. Optionally, active circuit 4 moreover includes a braking control valve system 47. FIG. 1, by way of example, shows an active circuit 4 including a total of four wheel brakes 43A, 43B, 43C, 43D and two separating valves 44A, 44B.

Pressure generation unit 40 includes a displacement piston 42, which is movable in a translatory manner, for example with the aid of an electric motor 41 or another drive. To convert a rotary motion of electric motor 41 into a translatory motion of displacement piston 42, a gearbox 41A is provided, which is shown only schematically in FIG. 1 and kinematically couples electric motor 41 to displacement piston 42. Displacement piston 42 is movable in a guide cylinder 42A, whereby a hydraulic fluid, for example oil, present in guide cylinder 42A is displaced.

Optional separating valves 44A, 44B may be implemented as electromechanical switching valves, for example. Separating valves 44A, 44B are each switchable between an open state, in which they allow fluid to flow through, and a closed state, in which separating valves 44A, 44B block fluid from flowing through. In FIG. 1, separating valves 44A, 44B are shown in a closed state by way of example.

Wheel brakes 43A, 43B, 43C, 43D each act via friction linings (not shown) on friction faces provided on a particular wheel (not shown), for example in the form of a brake disk 7, 7A, 7B, 7C, 7D, to decelerate the particular wheel.

Optional braking control valve system 47 is shown only schematically in FIG. 1 and is used to individually control individual wheel brakes 43A, 43B, 43C, 43D. Braking control valve system 47 is not explained in greater detail herein for the sake of clarity.

Optional separating valves 44A, 44B are hydraulically coupled to a pressure generation unit 40 via a branching hydraulic line 15. Furthermore, first pressure valve 44A is coupled via a branching hydraulic line 16 to brake disks 7A and 7B of the wheels (not shown). Second pressure valve 44B is coupled via a branching hydraulic line 17 to brake disks 7C and 7D of the wheels (not shown). Hydraulic lines 15, 16, 17 thus form a hydraulic path 45 between pressure generation unit 40 and the at least one wheel brake 43. Hydraulic lines 16, 17 connected to wheel brakes 43 form a brake-side portion 45A of hydraulic path 45. Hydraulic line 15 connected to pressure generation unit 40 forms a pressure generation-side portion 45B of hydraulic path 45.

FIG. 1 furthermore shows that sensor unit 46 is provided in pressure generation-side portion 45B of hydraulic path 45 and detects the actual braking pressure present there. FIG. 1, by way of example, also shows optional motor sensors 47A, 47B for detecting operating variables of electric motor 41, such as the operating current or a rotational position.

As is shown in FIG. 1, actuating circuit 2 may be hydraulically coupled to active circuit 4 via optional valves 26A, 26B to enable an actuation of wheel brakes 43 via master brake cylinder 22 in the event of an operating failure of pressure generation unit 40. For this purpose, displacement pistons 22A, 22B are connected via valves 26A, 26B to hydraulic lines 16, 17, it being possible for valves 26A, 26B to be designed analogously to separating valves 44A, 44B. In FIG. 1, valves 26A, 26B are shown in a closed state.

FIG. 1 furthermore shows that braking system 1 includes an optional reservoir 70, which contains hydraulic fluid. Reservoir 70 is hydraulically coupled via a check valve 71 to pressure generator-side portion 45B of hydraulic path 45. Check valve 71 is designed in such a way that it opens and allows a fluid flow into pressure generator-side portion 45B of hydraulic path 45 when the pressure in pressure generator-side portion 45B of hydraulic path 45 is lower than a predetermined threshold value. Optionally, a compensating line 72 is moreover provided, which hydraulically couples reservoir 70 to guide cylinder 42A. Compensating line 72 opens into guide cylinder 42A at a compensating opening, which is situated in such a way that the displacement piston 42 exposes the opening when it is situated in a maximally retracted position. In this way, pressure compensation may take place between reservoir 70 and pressure generator-side portion 45B of hydraulic path 45, whereby hydraulic fluid continues to flow into guide cylinder 42A.

As is furthermore shown in FIG. 1, control unit 5 is connected to final control system 20 of actuating circuit 2, in particular to sensors 23, 24 of final control system 20, to sensor unit 46 and to pressure generation unit 40. Control unit 5 may furthermore be connected to optional separating valves 44A, 44B, to optional valves 26A, 26B, and to optional motor sensors 47A, 47B. "Connected" is understood to mean a functional connection, in particular a data link, which may be implemented in a wired or wireless manner. Control unit 5 receives an actual pressure signal 46S representing the actual braking pressure, in particular from sensor unit 46.

Control unit 5 may, in particular, include a processor (not shown) and a data memory (not shown), the data memory including software which is configured to prompt the processor to execute the functions described hereafter or the method described hereafter.

The method according to the present invention is explained hereafter by way of example based on above-described braking system 1.

Initially, a braking intention signal 3 characterizing a braking intention is generated by actuating final control system 20 of actuating circuit 2. For example, actuating unit 21 is moved, and master brake cylinder 22 is actuated thereby against the restoring force of optional return simulator 25. Pressure sensor 23 and actuating distance sensor 24 detect a pressure and an actuating distance, respectively. Pressure sensor 23 generates a corresponding pressure signal 3A, and actuating distance sensor 24 generates a corresponding actuating distance signal 3B. These form braking intention signal 3 and are transmitted to control unit 5. Based on braking intention signal 3, control unit 5 ascertains a setpoint braking pressure required in active circuit 4 and generates a corresponding motor control signal 5M, which is transmitted to electric motor 41 of pressure generation unit 40.

Electric motor 41 is operated according to motor control signal 5M and thereby moves displacement piston 42 in such a way that setpoint braking pressure 9a is set in active circuit 4. Optionally, a closed control loop may be implemented with the aid of optional braking pressure sensor 46, in which actual braking pressure 9b is controlled in active circuit 4 according to setpoint braking pressure 9a. Optional separating valves 44A, 44B are opened. The actual braking pressure in active circuit 4 is increased until setpoint braking pressure 9a is reached.

Figures 2, 3:
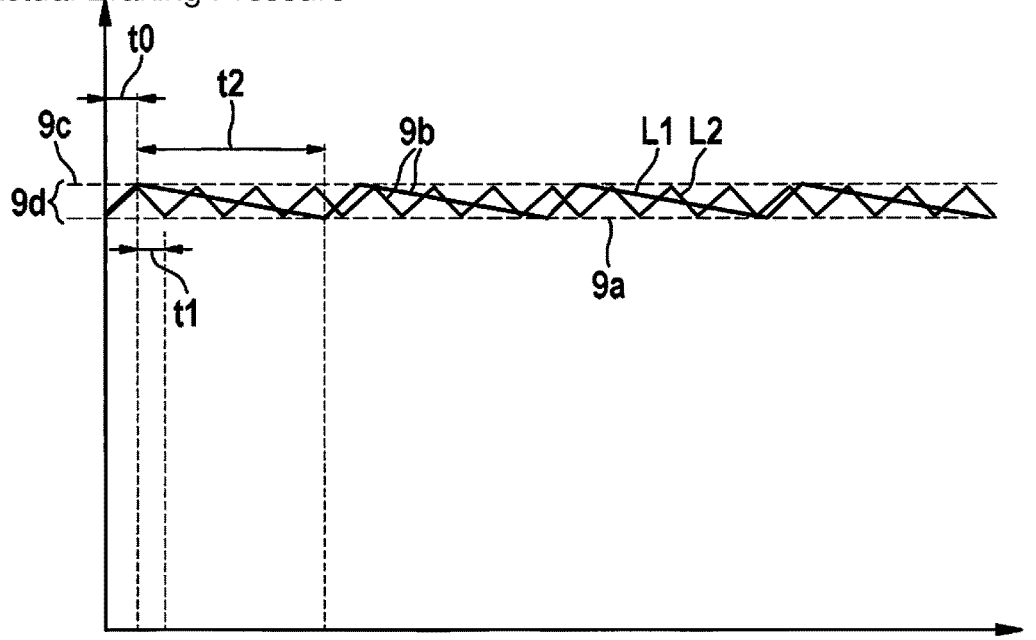
FIG. 2 shows a pressure progression in an active circuit of the braking system shown in FIG. 1, in particular in a pressure generator-side portion of a hydraulic path, while a pressure modulation is carried out according to a method according to one exemplary embodiment of the present invention.
FIG. 3 shows a pressure-volume characteristic of the active circuit of the braking system shown in FIG. 1 for a case in which no leakage is present in the active circuit.

After setpoint braking pressure 9a is reached, a pressure modulation of actual braking pressure 9b is carried out, as is shown by way of example in FIG. 2. The pressure modulation includes, in particular, a pressure increase, i.e., a setting of actual braking pressure 9b in active circuit 4 to a maximum value 9c greater than setpoint braking pressure 9a, and a subsequent pressure reduction of actual braking pressure 9b from this value until setpoint braking pressure 9a is reached again.

For carrying out the pressure modulation of actual braking pressure 9b, control unit 5 generates a motor control signal 5M, based on which pressure generation unit 40 or electric motor 41 is activated, whereby a movement of displacement piston 42 takes place. In particular, pressure generation unit 40 may be activated in such a way that displacement piston 42 is moved at a constant piston speed during the pressure reduction of actual braking pressure 9b. In particular during the pressure modulation, control unit 5 receives actual pressure signal 46S representing actual braking pressure 9b from sensor unit 46.

As is apparent from FIG. 2, the setting of maximum value 9c of the braking pressure may be carried out using a constant pressure gradient. For this purpose, for example, a closed control loop may be implemented with the aid of sensor unit 46. For increasing actual braking pressure 9b, proceeding from setpoint braking pressure 9a, to maximum value 9c, a build-up time t0 is required, as is apparent from FIG. 2.

In FIG. 2, line L1 schematically shows a chronological progression of actual braking pressure 9b during the pressure modulation, which results in active circuit 4 when the active circuit is tight, i.e., no leakage occurs due to undesirable exiting of hydraulic fluid from active circuit 4. A leakage may occur, for example, due to a lack of tightness of optional valves 26A, 26B or due to a lack of tightness at wheel brakes 43. As is apparent from FIG. 2 based on the progression of line L1, a pressure reduction time t2 which is required, when actual braking pressure 9b is being lowered, to lower actual braking pressure 9b from maximum value 9c to setpoint braking pressure 9a, is considerably longer in the case of a tight active circuit 4 than build-up time t0. For this purpose, displacement piston 42 of pressure generation unit 40 is moved at a predetermined, preferably constant, piston speed.

Line L2 plotted in FIG. 2 schematically shows the chronological progression of actual braking pressure 9b during the pressure modulation, which results in active circuit 4 when the active circuit is not tight, i.e., a leakage occurs, and displacement piston 42 is moved at the same predetermined piston speed which results in line L1 without leakage. As is apparent from FIG. 2, actual braking pressure 9b is in this case decreased, at the same piston speed, in a considerably shorter reduction time t1 from maximum value 9c to setpoint braking pressure 9a. This results in a considerably larger pressure gradient during the pressure reduction. The pressure gradient may be ascertained based on the chronological progression of actual braking pressure 9b detected by sensor unit 46 with the aid of control unit 5, for example by dividing the difference from maximum value 9c and setpoint braking pressure 9a by reduction time t1. If this chronological pressure gradient is outside a certain range, for example since it exceeds a certain threshold value, a leakage in active circuit 4 is detected according to the present invention. This may include, for example, storing a corresponding data set in a memory of control unit 5. Furthermore, it may optionally be provided that control unit 5 terminates the pressure modulation after the detection of a leakage and sets actual braking pressure 9b to setpoint braking pressure 9a with the aid of pressure generation unit 40 and sensor unit 46.

For the detection of a leakage, in particular reduction time t1, which is required when actual braking pressure 9b is being lowered to lower actual braking pressure 9b from maximum value 9c to setpoint braking pressure 9a, may be compared to build-up time t0. Since, during the pressure modulation, the same pressure difference 9d is overcome during the pressure build-up and the pressure reduction, build-up and reduction times t0, t1 represent the only variables which change the pressure gradient. A leakage is present, in particular, when reduction time t1 drops below a certain limiting value.

FIG. 3 shows a p-V diagram of active circuit 4 when no leakages whatsoever occur thereon, the actual braking pressure being plotted on the abscissa, and the volume of hydraulic fluid delivered in active circuit 4 by pressure generation unit 40 being plotted on the ordinate. As is apparent from curve 10 plotted in FIG. 3, the volume increases with increasing pressure.

Starting at a certain actual braking pressure 9e, an approximately linear relationship results between the actual braking pressure and the volume. In FIG. 3, furthermore a sloping tangent 11 is plotted at a pressure p*. Slope dV/dp of curve 10 is referred to as elasticity e of active circuit 4. Due to the linear progression of curve 10, elasticity e is constant starting at pressure 9e and may be ascertained for tight active circuit 4. Typically, the actual braking pressure moves always above pressure 9e in active circuit 4.

Elasticity e may be used to ascertain a leakage volume flow.

By moving displacement piston 42 during the pressure reduction, a volume flow $q_K$ of hydraulic fluid is generated, which may be computed from predefined speed v of the displacement piston and a known cross-sectional area A of the displacement piston as $$q_K = v \cdot A. \tag{I}$$

Pressure gradient $$\frac{dp_{actual}}{dt}$$

during the pressure modulation, as the actual braking pressure is being lowered, results from pressure difference $\Delta p$ between the initially set maximum value 9c and setpoint braking pressure 9a and time $t_1$ required for the pressure reduction, i.e.:

$$\frac{dp_{actual}}{dt} = \frac{\Delta p}{\Delta t_{ab}}. \tag{II}$$

In the event of a leakage, a total volume flow $q_{total}$, which is composed of volume flow $q_K$ generated by displacement piston 42 and a leakage volume flow $q_{leak}$, exits active circuit 4 during the pressure reduction, according to $$q_{total} = q_K + q_{leak}. \tag{III}$$

When active circuit 4 is tight, i.e., no leakage occurs and $q_{leak}=0$, active circuit 4 has elasticity e ascertained or ascertainable from curve 10 shown in FIG. 3. Elasticity e, in particular, describes the relationship $$e = \frac{dV}{dp_{actual}}, \tag{IV}$$

V representing the volume of hydraulic fluid displaced by displacement piston 42.

Total volume flow $q_{total}$ as $$q_{total} = \frac{dV}{dt} \tag{V}$$

results from the relationship from (IV)

$$q_{total} = e \frac{dp_{actual}}{dt}. \tag{VI}$$

Inserting (II) in (VI) results in:

$$q_{total} = e \frac{\Delta p}{\Delta t_{ab}}. \tag{VII}$$

With the aid of (III) and (I), the leakage volume flow may thus be determined using $$q_{leak} = e \frac{\Delta p}{\Delta t_{ab}} - v \cdot A. \tag{VIII}$$

Since, when $q_{leak}=0$, the pressure gradient is described by $$\frac{v \cdot A}{e},$$

it is also known for a known piston speed. A deviation of the actual pressure gradient from the pressure gradient which results for the known piston speed at $q_{leak}=0$ thus indicates the presence of a leakage.

Carrying out the pressure modulation may require, in particular, the presence of one or multiple of the following conditions:
  braking intention signal 3 is constant over a predetermined time period;
  a detected rotational speed of a wheel decelerated by wheel brake 43 is smaller than a predetermined rotational speed threshold value;
  ascertained setpoint braking pressure 9a of active circuit 4 is greater than a predetermined pressure threshold value;
  a variable characterizing a thermal loading of electric motor 41 of the pressure generation unit reaches a predetermined loading threshold value.

Herein, "constant" may, in particular, be understood to mean that a change in braking intention signal 3 is smaller than a predetermined value. For example, braking intention signal 3 is constant when neither pressure signal 3A nor actuating distance signal 3B change within a predetermined time period, for example over 3 seconds, by more than a predetermined value, for example by no more than 1 percent. A constant braking intention signal 3 results in a constant setpoint braking pressure 9a and in a constant actual braking pressure 9b.

What is claimed is:

1. A method for detecting a leakage during an operation of a braking system for a vehicle, comprising:
    generating a braking intention signal representing a braking intention by actuating a final control system of an actuating circuit;
    ascertaining a setpoint braking pressure required in an active circuit based on the braking intention signal;
    setting an actual braking pressure in the active circuit according to the setpoint braking pressure with the aid of a pressure generation unit by moving a displacement piston of the pressure generation unit to actuate a wheel brake coupled to the active circuit;
    carrying out a pressure modulation, including setting the actual braking pressure in the active circuit, to a value greater than the setpoint braking pressure, and lowering the actual braking pressure until the setpoint braking pressure is reached by moving the displacement piston at a predetermined piston speed;
    ascertaining a chronological pressure gradient, as the actual braking pressure is being lowered, during the pressure modulation; and
    detecting a leakage of the active circuit based on the ascertained pressure gradient when the pressure gradient is outside a range predetermined for the piston speed.

2. The method as recited in claim 1, wherein:
    the step of detecting the leakage includes comparing a reduction time that is required, when lowering the actual braking pressure, in order to lower the actual braking pressure to the setpoint braking pressure, to a build-up time that is required, when setting the actual braking pressure, in order to build up the actual braking pressure from the setpoint braking pressure to the value greater than the setpoint braking pressure.

3. The method as recited in claim 1, wherein, during the pressure modulation, the actual braking pressure in the active circuit is set to a value greater than the setpoint braking pressure using a constant pressure gradient.

4. The method as recited in claim 1, wherein the piston speed is constant as the actual braking pressure is being lowered during the pressure modulation.

5. The method as recited in claim 1, wherein carrying out the pressure modulation requires a presence of at least one of the following conditions:
    the braking intention signal is constant over a predetermined time period,
    a detected rotational speed of a wheel decelerated by the wheel brake is smaller than a predetermined rotational speed threshold value, and
    the ascertained setpoint braking pressure of the active circuit is greater than a predetermined pressure threshold value.

6. A braking system for a vehicle, comprising:
    an actuating circuit including a final control system actuatable with the aid of an actuating unit for generating a braking intention signal;
    an active circuit having a pressure generation unit that includes a displacement piston movable in a translatory manner;
    at least one wheel brake coupled hydraulically to the pressure generation unit;
    a sensor unit for detecting an actual braking pressure in the active circuit; and
    a control unit that is connected to the final control system of the actuating circuit, to the sensor unit, and to the pressure generation unit of the active circuit, wherein:
        the control unit ascertains, from the braking intention signal, a setpoint braking pressure required in the active circuit,
        the control unit activates the pressure generation unit for setting the actual braking pressure in the active circuit by moving the displacement piston according to the setpoint braking pressure;
        the control unit activates the pressure generation unit for carrying out a pressure modulation, including setting the actual braking pressure in the active circuit to a value greater than the setpoint braking pressure and lowering the actual braking pressure until the setpoint braking pressure is reached, by moving the displacement piston at a predetermined piston speed,
        the control unit ascertains, from the actual braking pressure detected with the aid of the sensor unit, a chronological pressure gradient, as the actual braking pressure is being lowered, during the pressure modulation, and
        the control unit detects a leakage of the active circuit based on the detected pressure gradient when the pressure gradient is outside a range predetermined for the piston speed.

7. The braking system as recited in claim 6, wherein the final control system includes:
    a master brake cylinder actuatable with the aid of the actuating unit, and
    a sensor unit for detecting at least one of a first variable corresponding to a hydraulic pressure in the actuating circuit generated by actuation of the master brake cylinder and a second variable corresponding to an actuating distance of the actuating unit, the first variable and the second variable representing a braking intention, the braking intention signal being formed by the first variable and the second variable variables.

* * * * *